(12) United States Patent
Cernasov et al.

(10) Patent No.: US 8,362,973 B2
(45) Date of Patent: Jan. 29, 2013

(54) SYSTEMS, APPARATUS AND FAST METHODS FOR ALIGNING IMAGES TO EXTERNAL MARKERS IN NEAR-TO-EYE DISPLAY SYSTEMS

(75) Inventors: Andrei Cernasov, Ringwood, NJ (US); Frank P. Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 588 days.

(21) Appl. No.: 12/468,601

(22) Filed: May 19, 2009

(65) Prior Publication Data

US 2010/0295754 A1    Nov. 25, 2010

(51) Int. Cl.
*G09G 5/00* (2006.01)
(52) U.S. Cl. .................. 345/8; 345/9; 382/103
(58) Field of Classification Search .......... 345/7–9, 345/633; 382/103
See application file for complete search history.

(56) References Cited

U.S. PATENT DOCUMENTS

| | | | | |
|---|---|---|---|---|
| 5,675,149 A | * | 10/1997 | Wood et al. | 250/332 |
| 6,064,749 A | * | 5/2000 | Hirota et al. | 382/103 |
| 6,522,312 B2 | * | 2/2003 | Ohshima et al. | 345/8 |
| 7,046,215 B1 | * | 5/2006 | Bartlett | 345/8 |
| 2002/0075201 A1 | * | 6/2002 | Sauer et al. | 345/7 |
| 2004/0080467 A1 | * | 4/2004 | Chinthammit et al. | 345/7 |
| 2005/0203380 A1 | * | 9/2005 | Sauer et al. | 600/417 |
| 2007/0273610 A1 | * | 11/2007 | Baillot | 345/8 |
| 2008/0259199 A1 | * | 10/2008 | Sako et al. | 348/333.01 |
| 2010/0141555 A1 | * | 6/2010 | Rorberg et al. | 345/8 |

* cited by examiner

*Primary Examiner* — Amare Mengistu
*Assistant Examiner* — Koosha Sharifi-Tafreshi
(74) *Attorney, Agent, or Firm* — Ingrassia Fisher & Lorenz, P.C.

(57) ABSTRACT

Provided are systems, apparatus, and methods for registering an image within a defined area within the confines of a user. The area is defined by one or more information markers that may be active or passive markers. A sensor operable to detect the information markers is rigidly attached to a motion tracker which is aligned and calibrated relative to the information markers and by detecting at least one of the information markers causes the virtual object image to appear to remain within the defined area.

20 Claims, 8 Drawing Sheets

FIG. 9

SYSTEMS, APPARATUS AND FAST METHODS FOR ALIGNING IMAGES TO EXTERNAL MARKERS IN NEAR-TO-EYE DISPLAY SYSTEMS

TECHNICAL FIELD

The subject matter described herein relates to methods that reduce blurring effects of virtual object images in Near-to-Eye ("NTE") systems when the images are registered to a specific physical display area due to rapid head motions of the viewer wearing an NTE display device.

BACKGROUND

One of the more important features in a cockpit is the Heads Up Display ("HUD") whereby flight control and tactical information is projected onto the wind screen of the aircraft so that the pilot may receive the information without taking his eyes from the airspace in front of him. However, there has been a growing interest in moving away from HUD systems to NTE or to NTE-HUD systems with head mounted viewing and sensor components that may be attached to a pilot's earphones or to his helmet.

A NTE system is characterized by a small display screen that is suspended directly in front of one or both of the pilot's eyes such that the displayed virtual object or the image moves about the display screen as the pilot turns his head to look for other aircraft, to look at his other controls and instrumentation, etc. The NTE display is otherwise transparent such that the pilot may see through, or see past, the display.

It would be disconcerting, disorientating and annoying to the pilot if information being sent to the NTE display was constantly visible in his NTE display as he looks around him for other aircraft or for cockpit instrumentation. As such, a NTE display processor is programmed to register or conform the NTE display information or virtual object within a specific area within the cockpit such that when the pilot is looking at the area of image registration the NTE information is visible in his NTE display and when he turns, nods or cocks his head (i.e. yaw, pitch and roll), the NTE information moves in the opposite direction, and even out of view, until the pilot returns his head back to a normal flight position.

The image registration is typically established by attaching one or more markers or marker bars to physical locations in the cockpit. The markers may have a particular shape, a particular pattern or emit light at a particular frequency. The shape, pattern or frequency can be detected by a sensor attached to the pilot's NTE headset. The detected position of the marker then causes the NTE processor to render the display on the NTE display screen only when the pilot's head is in a desired viewing position range relative to the marker. Because the markers emit or reflect energy information they may be termed energy markers or information markers.

However, the registration process as practiced in the art has not been perfected. It has been noticed that the pilot's head movements may be very fast. Yaw movement has been determined to reach the 1000 degrees per second range compared to a nodding action (pitch) and cocking action (roll) which has been measured in the 400 degrees per second range.

Because of relatively rapid head motions, blurring of the NTE image or virtual object can occur regularly when a pilot moves his head. This is so because a NTE head positioning sensor only periodically updates the position of a pilot's head. If a rapid yaw motion should occur during the interstitial time period between head position updates, sequential information frames will be presented with an abnormally large physical separation in the NTE display, the size of which is a function of the head's travel time and velocity. This separation results in the horizontal blurring of the virtual object image as the image "swims" away from its registration. The longer the latency between head position measurements, the worse the distortion. Therefore, there is a need to improve an NTE display to minimize the distortion resulting from a pilot's head movement.

SUMMARY

It should be appreciated that this Summary is provided to introduce a selection of exemplary, non-limiting concepts. In one exemplary embodiment, a system for registering an image to a defined external area as perceived through a near-to-eye (NTE) raster scan video display worn by a user is provided. The system includes at least one information marker remote from the user. The system also includes a wearable device comprising a sensor, wherein the sensor detects the at least one information marker, a video display rendering an image, wherein a raster scan of the video display is genlocked with a raster scan of the sensor; and a processor in operable communication with each of the sensor and the video display. The processor is operable to receive user motion data from the motion tracker and to also receive information marker position data from the sensor. The processor then adjusts the position of the image to appear in the location in the defined external area based at least in part on the user motion data and the information marker position data.

In another exemplary embodiment, a method for registering an image to a defined external area as perceived through a near-to-eye (NTE) raster scan video display worn by a user is provided. The method includes affixing a first marker to known location within the confines of the user, wherein the location marker exhibits a uniquely distinguishing feature and then aligning and calibrating a sensor operable to detect the uniquely distinguishing features of the information marker to a motion tracker operable to discern the movement of the NTE video display. Each of the sensor and the tracker are rigidly connected together. The method continues on to electronically synchronize a raster scan periodicity of the sensor and a separate raster scan periodicity of the NTE video display where the periodicity of the sensor raster is faster than the periodicity of the NTE video display raster. A computing device then executes commands to identify the first marker detected by the sensor, retrieve the location of the first information marker from memory, calculate a sensor display offset between the retrieved location of the identified marker and the user motion data, convert the sensor display offset to a pixel address offset within the video display, and determine a pixel address within the video display from which to continue render the virtual object image.

In another exemplary embodiment, an apparatus is provided for registering an image to a defined external area as perceived through a near-to-eye (NTE) raster scan video display worn by a user. The apparatus includes a sensor operable to detect at least one information marker, a motion tracker rigidly affixed to the sensor and a video display rendering an image. The raster scan of the video display is genlocked with a raster scan of the sensor. The apparatus also includes a processor in operable communication with the sensor, the motion tracker and the video display. The processor receives user motion data from the motion tracker and receives information marker position data from the sensor and adjusts the position of the virtual object image to appear in the location in the defined external area based at least in part on the user motion data and the information marker position data.

BRIEF DESCRIPTION OF THE DRAWINGS

FIGS. 8a-f is a set of exemplary synchronized operational current and voltage graphs for the fast CMOS sensor cell of FIG. 7.

DETAILED DESCRIPTION

The following disclosure is merely exemplary in nature and is not intended to limit the invention, the application or the uses of the invention. Furthermore, there is no intention to be bound by any theory presented in the preceding background or the following detailed description.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an aircraft. However, it will be understood by those of ordinary skill in the art that the subject matter is similarly applicable to many vehicle types and activities as human head movement is the same in any environment. Non-limiting examples of other vehicle types in which the subject matter herein below may be applied includes aircraft, spacecraft, watercraft and terrestrial motor vehicles. Non-limiting, non-vehicle environments may include virtual reality systems and simulators.

The subject matter disclosed herein may be incorporated into any suitable navigation, flight control system, or virtual reality system that currently exists or that may be developed in the future. Without limitation, terrestrial motor vehicles may also include military combat and support vehicles of any description.

Figure 1:
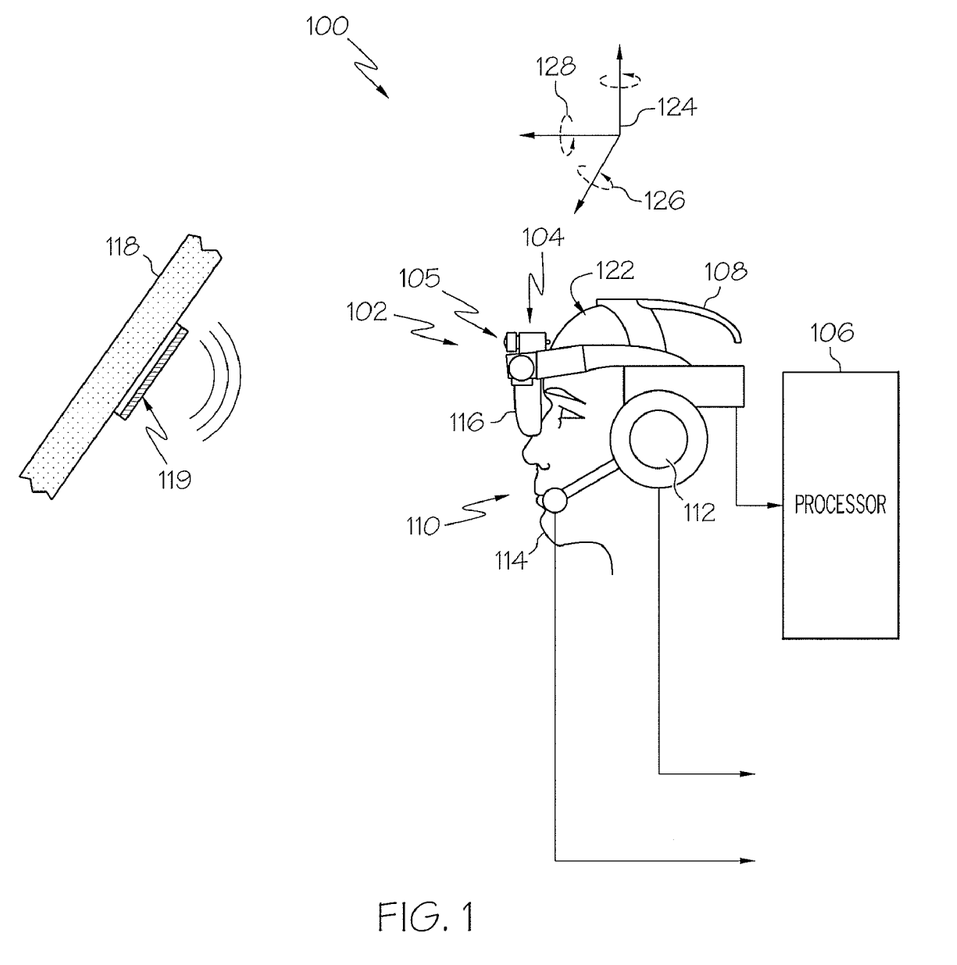
FIG. 1 is a simplified rendering of a NTE display system.

Turning now to FIG. 1, an exemplary embodiment of an NTE display system 100 that may be used in a vehicle is depicted. No matter the particular end-use for the vehicle, the display system 100 includes at least a near-to-eye (NTE) display device 102, a motion tracker 104, a marker sensor 105, a processor 106, and one or more information markers 119. The information markers transmit information that is communicated by transmitting light, sound or thermal energy and therefore may also be known as energy markers.

The NTE display device 102 is preferably mounted on a headset 108. The headset 108 may be variously configured, but in the depicted embodiment the headset 108 is configured to be worn by a user (or viewer) 110, and includes one or more earphones 112 and a microphone 114. The earphones 112 are adapted to generate audio signals in response to signals received from, for example, a suitable non-illustrated interface. It will be appreciated that the non-illustrated interface may receive signals from, for example, a non-illustrated vehicle radio, the processor 106, and/or one or more other non-illustrated devices. It will additionally be appreciated that the earphones 112 may be variously implemented. For example, the earphones 112 may be implemented as active noise reduction (ANR) devices or passive devices.

The microphone 114 is adapted to detect viewer utterances or other vehicle noises and to transmit signals representative of the detected utterances or noises via, for example, a suitable non-illustrated interface. It will be appreciated that the non-illustrated interface may supply the signals to, for example, the non-illustrated vehicle radio, the processor 106, and/or one or more other non-illustrated devices. The microphone 114 may include, for example, a noise cancelling microphone or any one of numerous other suitable devices. In some embodiments, headset 108 also may include a non-illustrated push-to-talk (PTT) switch which, when depressed, causes the non-illustrated vehicle radio to transmit pilot utterances detected by the microphone 114 over the air. In other embodiments, a PTT switch may be disposed at a location remote from the headset 108.

The NTE display device 102, as noted above, is preferably mounted on the headset 108, and may include a monocular or a binocular set of displays 116. Although the configuration of the displays 116 may vary, in one embodiment each display 116 includes a transparent display panel (e.g., a liquid crystal on silicon display), a light source (e.g., light emitting diodes), one or more prisms adapted to deflect light generated by the light source, one or more polarizers, and one or more lenses. With this configuration, the NTE display device 102 may display one or more virtual images to the viewer 110. That is, the one or more displayed images appear to the viewer 110 to overlie (or otherwise be disposed in proximity to) another surface, such as a vehicle windshield 118, and/or one or more non-illustrated vehicle instruments, and/or one or more non-illustrated vehicle control components. In some embodiments the NTE display device 102 may be adjustably mounted on the headset 108. By adjustably mounting the NTE display device 102 on the headset 108, the NTE display device 102 may be manipulated into and out of the field of view of the viewer 110. In other embodiments, the NTE display device 102 may be a holographic display device.

The motion tracker 104 is preferably mounted on the headset 108 and is configured to sense movements of at least the viewer's head 122. More specifically, the motion tracker 104 is configured to sense movement of the display device 102, and to supply a signal representative of the sensed movement to the processor 106. In one particular embodiment, the motion tracker 104 is configured to sense, either directly or indirectly (e.g., derived from sensed position), at least a movement rate of the display device 102 by sensing movement rate of the viewer's head 122, and to supply a signal representative of the sensed movement to the processor 106. In any case, the movement that the motion tracker 104 senses preferably includes both translational movements and angular movements. The motion tracker 104 may also be configured, at least in some embodiments, to sense the position and orientation of the viewer's head 122.

The viewer's head position may be represented, for example, in terms of offsets from a static, default point in the vehicle. The viewer's head orientation may be represented, for example, in terms of angles of rotation about a set of orthogonal reference axes (e.g., axes 124, 126, 128). For example, viewer head movements to the left or right may be represented in terms of angular rotation about axis 124, viewer head movements up or down (e.g., nods) may be represented in terms of angular rotation about axis 126, and viewer head tilts to the left or right may be represented in terms of angular rotation about axis 128.

It will be appreciated that although FIG. 1 depicts the motion tracker 104 as a single sensing device, the motion tracker 104 may be implemented, if needed or desired, as a plurality of sensing devices. Moreover, the particular type and configuration of the motion tracker 104 may vary, and may be implemented as any one of numerous suitable devices including, for example, an inertial movement unit (IMU), an inertial navigation unit (INU), one or more magnetometers, or auxiliary cameras locking on reference signals, just to name a few.

The motion tracker 104 may serve the role as a backup image positioning device. In embodiments where there are few information markers 119, one or more of the information markers 119 may be blocked from view by the pilot's hand, by a casualty to the marker, etc. If an information marker 119 is not within view, then the sensor tracker 104 predicts where the information marker(s) should be so that the image may be conformed in the correct location. In embodiments where there exists a multitude of information markers 119, such that at least one information marker 119 may always be in view of the marker sensor 105, the motion tracker 104 may be dispensed with or be optional.

Figure 7:
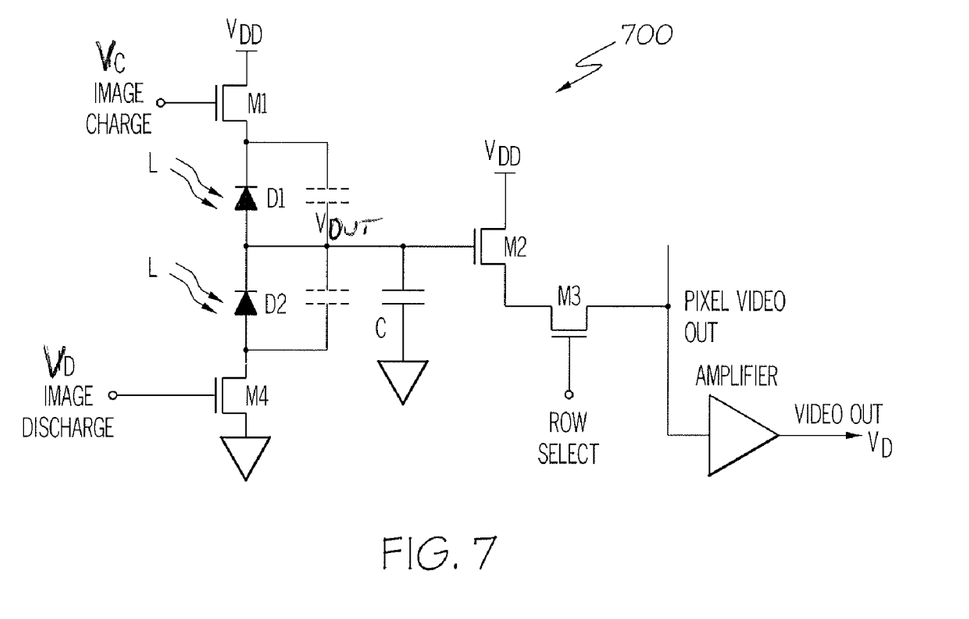
FIG. 7 is a simplified circuit diagram for an exemplary fast CMOS sensor cell.

The marker sensor 105 is configured to sense emissions from the markers 119 and supply marker identification data to the processor 106. The marker sensor 105 may be any one of numerous suitable optical devices that may operate in any, or all, of the visible, infrared or ultraviolet spectrums. As a non-limiting example, the marker sensor 105 may be any suitable type of video camera that is either acquired commercially off the shelf or custom designed and that may exist now or in the future. Alternatively, the marker sensor 105 may be an infrared or an ultraviolet detector with a suitable directional sensitivity as may currently exist or be developed in the future. In other embodiments, the marker sensor 105 may comprise a Fast Dual Linear Array 500 or a Low Latency Tracker Sensor 700. In still further exemplary embodiments, the marker sensor 105 may be an acoustic sensor, thermal, or a radio frequency detector. As may be appreciated, the specific type of sensing device used may depend, at least in part, on the implementation of the markers 119. Examples of exemplary suitable marker sensors 105 will be described further below.

The preferable operational aspect of the marker sensor 105 is forward, which would be directly in front of the wearer 110 and/or in the direction of movement of the vehicle. However, the operational aspect of the marker sensor 105 may lay in any direction. In some embodiments, the operational aspect of the marker sensor 105 may be to the rear of the wearer, 180° from the line of sight of the wearer. In other embodiments, the operational aspect may be in any other direction. The NTE system 102 may operate just as well using any particular aspect of the marker sensor 105 depending on the location of the cockpit marker bar(s) 119. However, for the sake of brevity and clarity, the operational aspect of the marker sensor 105 described herein below will be assumed to be directly forward of the wearer 110.

The marker sensor 105 is rigidly mounted on the headset 108 and affixed in relation to the motion tracker 104 such that the relative positions of the marker sensor 105 and the motion tracker 104 cannot be altered during normal operations. Preferably, the marker sensor 105 is rigidly mounted to, and forward of the motion tracker 104. However, the marker sensor 105 may also be attached on top of, below or beside the motion tracker 104. In other embodiments, the marker sensor 105 and the motion tracker 104 may both be incorporated within the same housing. In still other embodiments, the marker sensor 105 and tracker may be located distant from one another on the headset 108 as along as the respective locations are known and are unalterable in a normal operating environment.

The NTE display device 102, the marker sensor 105, and the motion tracker 104 are all in operable communication with the processor 106. The processor 106 may be a general purpose processor or a special purpose processor. The processor 106 may be implemented as one or more co-processors and/or other suitable electronic components of sufficient speed, and may be configured to implement one or multiple functions. It will be appreciated that the processor 106 may be mounted on the headset 108, or it may be disposed remote from the headset 108 and form part of one or more other non-illustrated systems. It will be appreciated that the processor 106 may render the one or more images on the NTE display device 102 in response to various signals it receives from marker sensor 105 and motion tracker 104. No matter its specific location, the processor 106 is additionally responsive to the position data supplied from the marker sensor 105 and to the user motion data supplied from the motion tracker 104 to adjust the position of the virtual image. Processor 106 is also a non-limiting example of a computer readable medium.

Once the marker sensor 105 and the motion tracker 104 are rigidly attached to the headset 108, the marker sensor array 105*b* and the NTE display 102 are calibrated and aligned such that a substantially 1:1 correspondence is established between the pixels of the of the display 102 and the pixels of the marker sensor array 105*b*. In addition, the timing of the sensor scan is "genlocked" to that of the NTE display 102 scan with the horizontal and vertical scan times of the marker sensor array 105*b* being equal to, or a fraction of, the corresponding scan times of the NTE display 102. As a non-limiting example, if the display 102 operates at a speed that displays 60 frames per second, the sensor array may preferably operate at a speed that scans the cockpit at 120, 180, or 240 times per second. The faster the sensor scanning frequency, the more effective the image registration.

As is generally known, genlock refers to an electronic circuit that allows the synchronization of two or more video devices. Genlock performs three main functions: vertical, horizontal and frame synchronization. In the present context, a common clock 310 (See FIG. 3) is used to synchronize the raster scan of the NTE display array 102 to the raster scan of the marker sensor 105 as it scans for a marker bar 119.

Figure 2A:
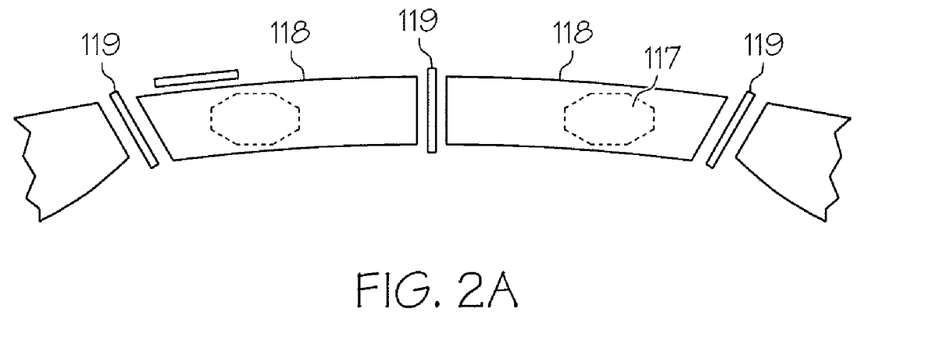
FIGS. 2a and 2b are exemplary renderings of a cockpit with various marker orientations.
Figure 2B:
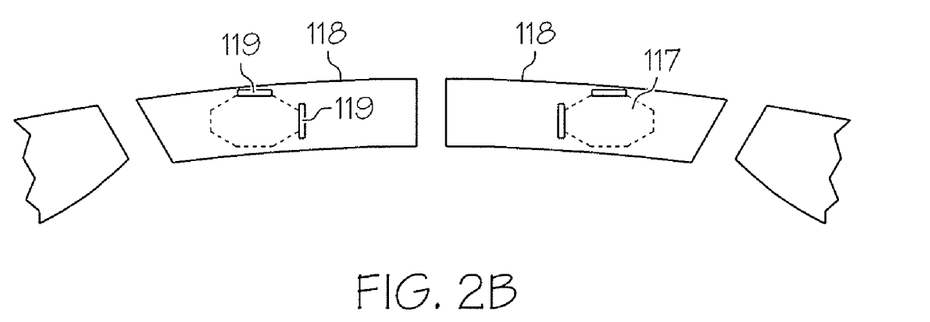

FIGS. 2*a* and 2*b* depict exemplary, non-limiting dispositions of markers or marker bars 119 within a cockpit in regard to the vehicle windshield(s) 118 and the desired location of the HUD virtual images 117. The markers 119 may be configured or "position modulated" in any suitable pattern as may be desired. Non-limiting examples of marker patterns may include bars, circles, squares, dots, boxes, rectangles, etc. The various geometries of potentially useful markers 119 are limitless.

The information markers 119 may be implemented as either passive markers or active markers and may be position modulated using passive signatures or active signatures, respectively. Passive markers 119 may be identified by the marker sensor 105 by their reflection of color, shape or by a design affixed thereon. Exemplary, non-limiting designs may include stripes, words, checks, symbols, letters, circles, crosses, triangles and the like. The number of potentially useful marker patterns is limitless. Active markers may transmit energy signatures such as a specific frequency of visible, infrared or ultraviolet light. In some embodiments, the active markers 119 may transmit different frequencies of energy at different locations within a pattern. In other embodiments, the markers 119 may alternate or combine energy emissions in a timed sequence or in a programmed sequence within a pattern. Both passive and active information markers 119 provide fixed position information to the NTE display device 102.

Further, to the extent that a sound source may be uniquely identified and accurately located within a vehicle, sound energy may also be used as a marker signature within the context of an information marker 119. Radio frequency energy, acoustic energy and thermal energy may also be used for the same function.

Regardless of the operating principal, shape, pattern or other signature identifying the information marker 119, the processor 106 is programmed to detect and identify the unique signature of each of the markers 119 in its operating environment (e.g. a cockpit) from electronic signals sent by the marker sensor 105. It is preferable that the detection of the signature of an information marker 119 by the processor 106 be as fast as possible.

Each, information marker 119 location stored is within the processor 106. As herein disclosed, a virtual display image 117 will appear to be conformed or registered within the area associated with or bounded by one or more information markers 119.

The information markers 119 may be laid in any orientation relative to each other. However, to the extent that a parallel or a closed circuit orientation would create ambiguities as to which information marker 119 was being detected, a parallel or a closed circuit orientation may be less desirable relative to some other orientation.

Figure 3:
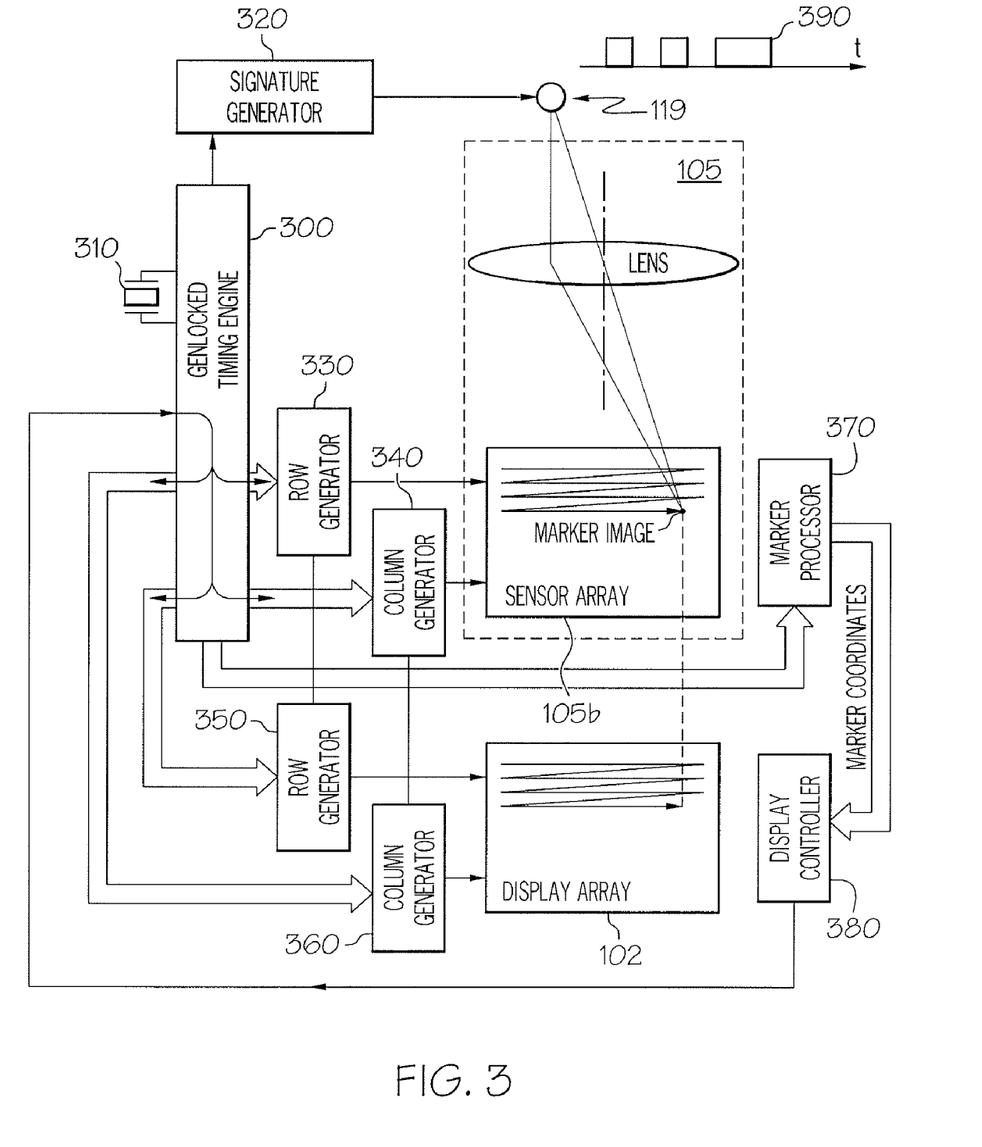
FIG. 3 is a functional block diagram depicting portions of the NTE display system of FIG. 1 in more detail.

FIG. 3 is a functional block diagram that depicts portions of the NTE display system in more detail. It will be appreciated that in other embodiments various functional blocks depicted in FIG. 3 may be implemented within the processor 106 of FIG. 1. Moreover, one or more of the functional blocks may be implemented in the marker sensor 105 and/or the display 116 of FIG. 1. The block diagram of FIG. 3 will be further described in coordination with the exemplary method depicted in FIG. 4.

Figure 4:
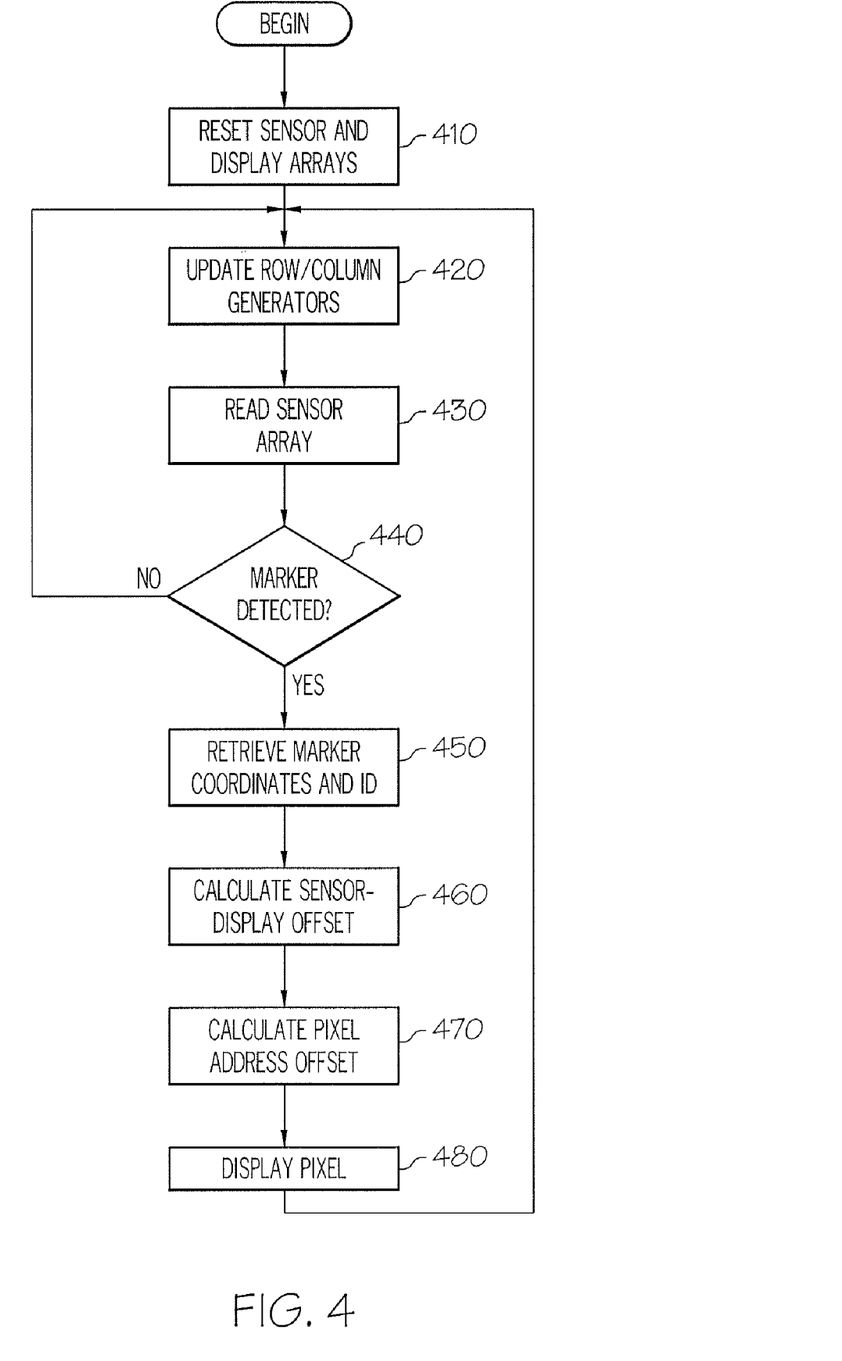
FIG. 4 is a simplified flow chart for a fast method for aligning images to external markers.

The simplified method of FIG. 4 begins at processes 410/420 where the synchronized row generators (330,350) and the synchronized column generators (340,360) of the sensor array 105*b* and the display 116, respectively, are reset to a beginning state. It will be appreciated that the column generators (340, 360) do not have to be absolutely in synch, nor do the row generators (330, 350). The genlocked pairs of generators may have a phase difference as long as the phase difference is constant in terms of pixels or in terms of pixels and/or rows of pixels.

At process 430, the marker sensor 105 is read. Because the speed of the marker sensor array 105*b* may be several times faster than the array speed of the display 102, the marker sensor 105 may scan the cockpit several times before the display 102 completes a single frame. Therefore, there may be multiple opportunities for the marker sensor 105 to detect the signature 390 of the information marker 119 during the rendering of a single display frame. Marker signatures 390 may be generated by the signature generator 320 which may be genlocked with the marker sensor array 105*b*. Signature generator 320 may comprise one ore multiple signal generators and my drive the signatures of any or all of the information markers 119.

The marker signatures 390 may be detected by comparing a number of consecutive images by marker sensor 105. As a non-limiting example, four consecutive image frames may be captured. Each frame may be compared to the others in sequence pixel-by-pixel. Marker signatures 390 may be detected by noting that a specific pixel or a group of pixels in each frame are either ON or OFF in predetermined sequential pattern. Similarly, the intensity pattern within a specific group of pixels from frame-to-frame may be a marker signature 390.

At decision point 440, marker processor 370 determines whether or not the marker signature 390 has been detected by marker sensor 105. If no marker signature 390 is detected, then the display column generator 360 and display row generator 350 are updated at process 420 and the marker sensor 105 is again read at process 430. This loop continues until a marker signature 390 is detected. It will be appreciated that if no marker signature 390 is detected during a predetermined number of cycles, the display column generator 360 and the display row generator 350 causes the NTE display device 102 to be incrementally advanced to the next pixel or the next row of pixels. The number of sensor scans that occur before the NTE display 102 is advanced is at least partially determined by the genlocked speeds of the sensor and the display scans. As is depicted in FIG. 3, the genlock timing engine 300 and its clock 310 keep the column generators (340,360), the row generators (330, 350) and the marker processor 370 synchronized together as the column and row generators work their way through their respective raster scans pixel-by-pixel. It will be appreciated that the display 116 and marker sensor 105 raster scans are typically oriented horizontally but also may be oriented vertically, instead.

If an information marker 119 is detected, the marker processor 370 using the marker's unique signature 390, identifies the detected information marker 119. The marker processor 370 then retrieves the spatial coordinates of the identified marker. It will be appreciated that because the marker 119 is identified by its signature 390, it is not important which particular marker is detected or in what order. The detection by the marker sensor 105 of any information marker 119 as the pilot moves his head 122 about the cockpit will suffice. Therefore, the more unique markers 119 placed about the cockpit, the faster a marker will be sensed, resulting in the display 106 being adjusted more quickly. As such, even having markers behind the pilot, beside the pilot or above the pilot that may be detected by a marker sensor 105 would prove beneficial.

At process 460, a sensor display offset is calculated between the location of the information marker 119 detected within the sensor array 105*b* and the location of the information marker 119 within the display 104. As a non-limiting example, the marker processor 370 may provide the spatial display array coordinates of the detected information to the display controller 380. The sensor display offset is used by the display controller 380 to calculate, at 470, a pixel address offset. The pixel address offset is the pixel address in the display 116 where the detected information marker 119 should be located in the display 116 based on its actual location coordinates in the cockpit.

As a non-limiting example, the sensor display offset may be determined by comparing the predicted location of a particular information marker 119 as determined by the motion tracker 104, to that of the actual position of the particular information marker 119 as determined by the marker sensor 105. The sensor display offset is then the difference horizontal and vertical pixel count between the predicted image location of the motion tracker 104 and the actual image location as determined by the marker sensor 105.

At process 480, the pixel address offset is transmitted to the genlock timing engine 300, which then resets the display array column generator 360 and row generator 350 causing the virtual object image being rendered to be continued at the pixel located at, or predicatively proximate to, the pixel location of the detected information marker 119. The remaining portion of the virtual object image 117 being rendered at the time of the reset is then displayed in its properly registered location in the display array 102. From the pilot's point of view, the result would be that the virtual object image 117 that he is seeing is conformal or is "sticking" to a constant location relative to the marker(s) 119 within the cockpit. It will be appreciated that with a large number of information markers 119, each with a unique signature 390, the marker processor 370 can detect any of the unique information markers and thereby generate a sensor display offset faster than would otherwise be the case. As such, the image would have a better registry to its assigned location in the cockpit.

As discussed above, any suitable video camera may be used as the marker sensor 105. However, conventional video cameras are relatively slow with frame scan speeds that are on the order of 16.67 ms per scan cycle. It is desirable to increase the sensor scan speeds to be as fast as practicable so that when the raster of the sensor array 105b reaches an information marker 119, it can decode and recognize the information marker 119 within the time that it takes to process one pixel. The pixel frequency of a conventional video camera is approximately 13.5 MHz (about 100 µsec per pixel).

A faster alternative may include the use of a Dual Linear Array video camera 500 where the linear arrays are arranged orthogonally. Two non-limiting examples of such technology are depicted in FIGS. 5a and 5b, where FIG. 5b is the same as 5a but rotated 45°.

Figure 5A:
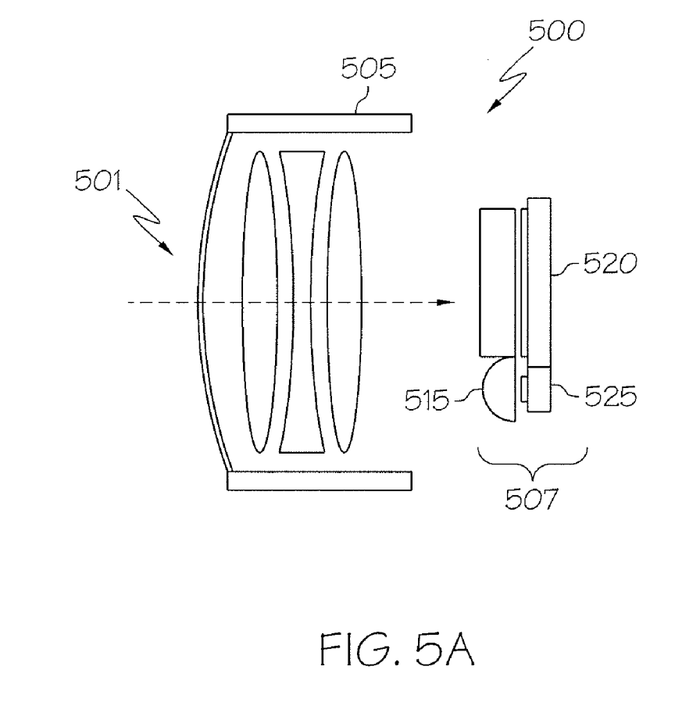
FIG. 5 illustrates a simplified rendition of an exemplary dual linear array sensor.
Figure 5B:
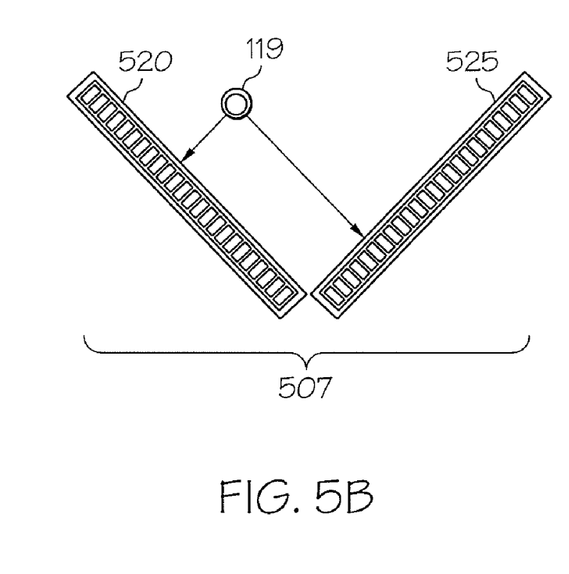

FIG. 5a depicts a side view of a conventional front end camera lens 505 of camera 500 that allows image data to impinge upon the orthogonally disposed dual linear array 507. As a non-limiting example, each linear array may comprise 512 pixels. The dual linear array 507 further comprises a cylindrical lens 510/515 in front of each orthogonal linear array such that the cylindrical lens 510 is in a vertical orientation and the cylindrical lens 515 is in a horizontal orientation into the drawing. The cylindrical lenses 510 and 515 act as one-way magnifying glasses so that the horizontal and vertical position of a detected information marker 119 can be more precisely determined. FIG. 5b is a front, planar illustration of an equivalent but alternative arrangement that is rotated 45° from FIG. 5a. A dual linear array sensor may increase the scanning speed of the marker sensor 105 by 100× over a standard video camera. The scan speed using dual linear array may therefore be on the order of 500 µsec per scan cycle.

However, for more sophisticated marker signatures 390 to be employed, much faster speeds may be required such that a marker sensor 105 response to detecting a marker signature 390 may occur well within a pixel period. Such speeds may be achieved by using complimentary-metal-oxide-semiconductor ("CMOS") sensor arrays in other exemplary, non-limiting alternative embodiments.

Figure 6:
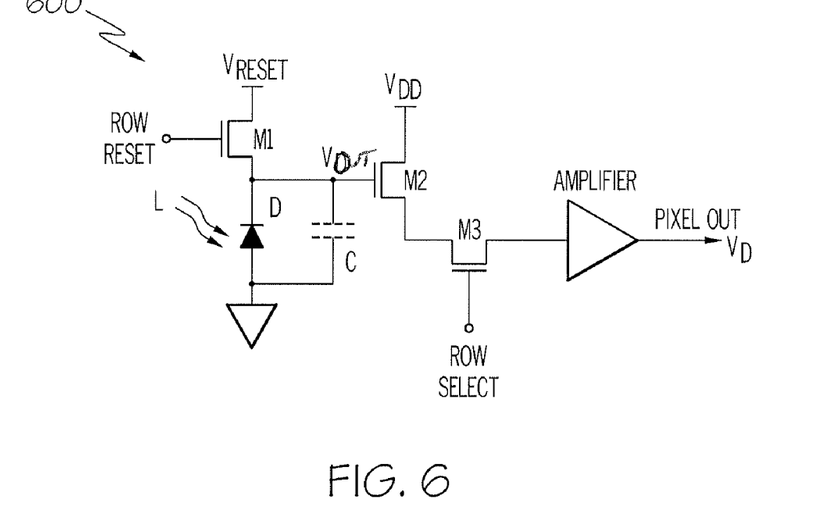
FIG. 6 is a simplified circuit diagram of a conventional CMOS sensor cell.

FIG. 6 is a circuit diagram of an elementary CMOS integrated circuit. The main components of a typical pixel cell 600 are a photodiode D, a switch M1, a voltage follower M2, and an output switch M3. The detection cycle of the cell starts by applying $V_{RESET}$ across the diode D and its associated capacitance C, which is a known voltage level. This is accomplished by biasing "on" transistor M1 so that it provides a path for the capacitance C to charge. Then M1 is turned off. However, any light L impinging on the junction of the photodiode D will generate charge carriers within its depletion region. These charge carriers will act to discharge the capacitance C at a rate proportional with the local intensity of the light L. After a predetermined integration time has passed ($T_{Pixel}$) (See FIG. 8), a transistor M3 samples the output of the voltage buffer transistor M2. The output is essentially equal to the voltage at the gate of transistor M2, which is also the remaining voltage across the diode D after a charge decay induced by the illumination of the junction of the diode D.

To provide faster marker recognition, an ultra fast pixel cell 700 that can by itself recognize a very fast marker signature 390 while still integrating the image input over a relatively long exposure time may be used. FIG. 7, is a non-limiting exemplary circuit diagram of an ultrafast CMOS integrated circuit, or cell. The ultrafast pixel cell 700 is similar to the pixel cell 600 with the addition of a controlled discharge path M4 and the replacement of photodiode with a pair of photodiodes D1, D2 which together have an equivalent combined photosensitive area of the photodiode of FIG. 6. The reading circuit ($V_{DD}$, M2, M3) and the amplifier are the same as in FIG. 6. The operation of the light sensitive portion of the ultra fast pixel cell 700 (M1, M4, D1, D2, C) is controlled by a pair of voltage signals $V_C$ and $V_D$ which are 180° out of phase. (See, FIG. 8).

When $V_C$ is positive, the transistor M1 is ON allowing the capacitor C to charge at a rate proportional to the illumination on the back biased photodiode D1. During this time period the $V_D$ is kept low, transistor M4 is OFF and the capacitor discharge path through the transistor M4 is cut off. Conversely, when $V_D$ is positive, the transistor M4 is ON thus discharging the capacitor C at a rate proportional to the illumination of the back biased photodiode D2. Since during this second time period $V_C$ is low, there is no charging current and the voltage across C drops.

D1 and D2 are physically adjacent to each other. Their outputs under uniform and constant exposure to light L are equal. Therefore, if $V_C$ and $V_D$ are square waves 180° that are out of phase and the background illumination is constant and is integrated over the time (See, FIG. 8D) then $V_D$ (See, FIG. 8C) is approximately zero over time ($T_{Pixel}$) because half of the time the voltage is increasing from zero and half the time the voltage is decreasing back toward zero.

Figure 8A:
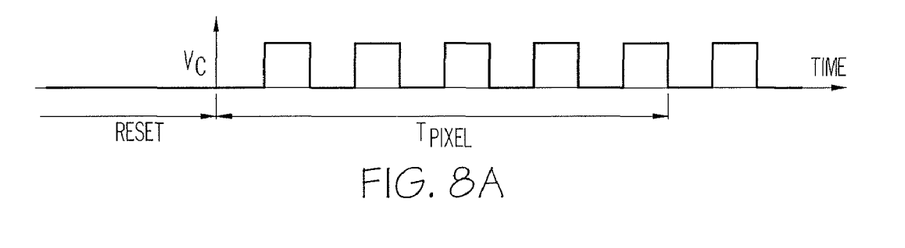
Figure 8B:
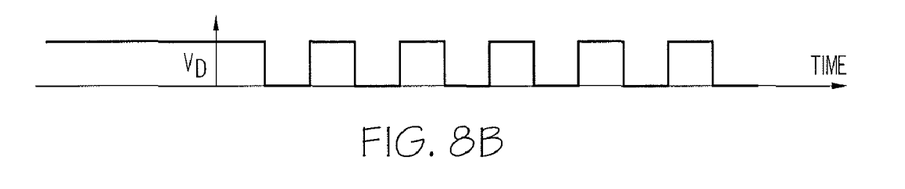
Figure 8C:
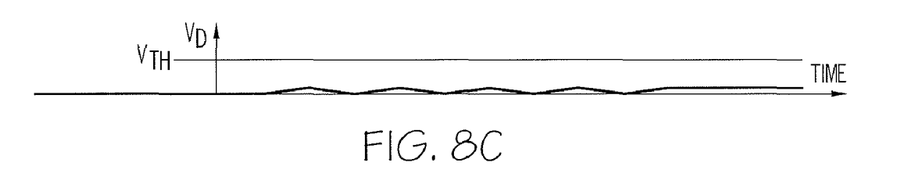
Figure 8D:
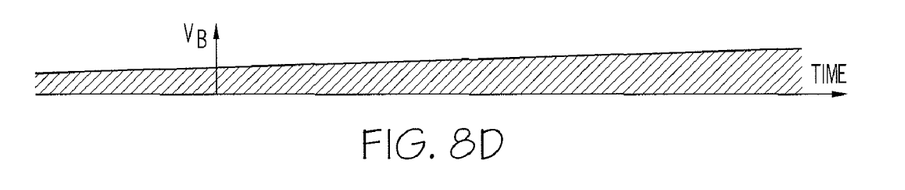
Figure 8E:
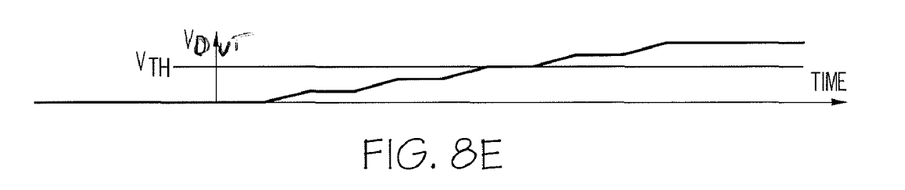
Figure 8F:
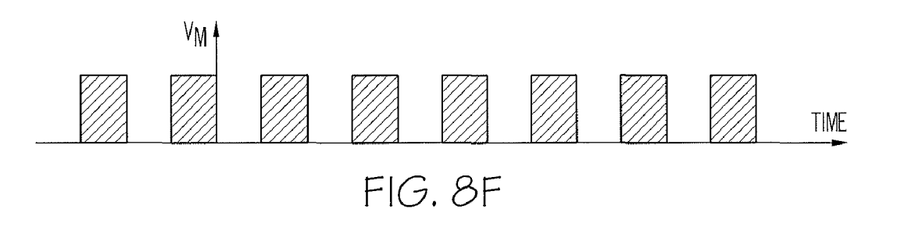

However, if a marker signal 390 in the cockpit is ON when $V_C$ is high and off when $V_D$ is high, the marker signal 390 exposes photodiodes D1 and D2 in a synchronized fashion with $V_C$ being positive ($V_D$ being zero) (See, FIG. 8F). Therefore, the capacitor C charging currents with the marker ON are much larger than the discharge currents (when the marker OFF) because the light exposure across diodes D1 and D2 is NOT uniform over time. Because the information marker 119 increases the light exposure during half of the time and is not allowed to immediately drop, the voltage across the capacitor C is allowed to increase above a detectable level $V_{TH}$ (See, FIG. 8E). The very fast marker signature results in reducing sensor raster latency periods to less than a single pixel period.

Figure 9:
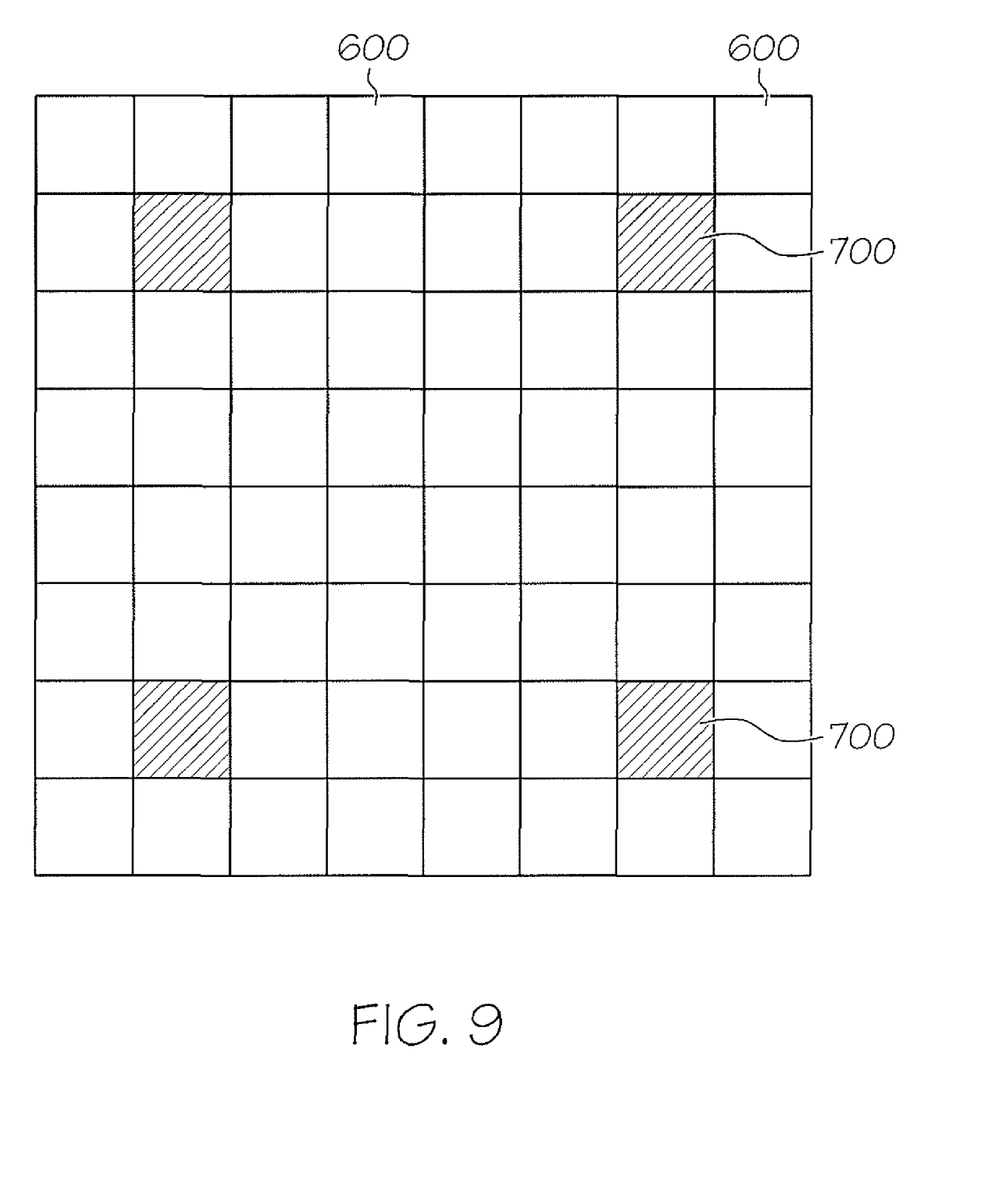
FIG. 9 is a depiction of a sensor array with embedded marker detection cells.

In yet another embodiment as depicted in FIG. 9, marker detection cells 700 may be dispersed within an array of pixel cells 600. Because cockpit markers 119 are physically much larger than pixels, this configuration enables the sensor array 105b to detect marker signatures 390 simultaneously as the array pixels are read resulting in a sub-single pixel period latency between the capture of the information marker 119 image and the identification of the marker by marker processor 370.

Because the pixel cells 700 are ultra fast, several sequential readings from the same marker detection cell 700 may be taken before the marker sensor 105 proceeds to the next slow pixel cell 600 and compared against themselves to detect a marker signature 390. This arrangement allows an individual pixel cell to operate as an independent marker detector 370 allowing ultrafast tracking with speeds limited only by the material characteristics of the photodiode D1, D2 materials.

The subject matter described above is provided by way of illustration only and should not be construed as being limiting. Various modifications and changes may be made to the subject matter described herein without following the example embodiments and applications illustrated and described, and without departing from the true spirit and scope of the present invention, which is set forth in the following claims.

What is claimed is:

1. A system for registering an image to a defined external area as perceived through a near-to-eye (NTE) raster scan video display worn by a user, comprising:
    at least one active marker disposed remote from the user, wherein each of the at least one active marker is configured to emit a uniquely distinguishing feature;
    a marker sensor configured to detect the uniquely distinguishing feature of each of the at least one active marker and supply marker identification data;
    a video display configured to render an image, the video display being genlocked with the marker sensor and the uniquely distinguishing feature; and
    a processor in operable communication with the marker sensor and the video display, the processor operable to, upon receipt of motion data and the marker identification data, cause the image to appear in the defined external area.

2. The system of claim 1 further comprising a motion tracker rigidly affixed to the sensor and configured to sense user motion and supply user motion data representative thereof.

3. The system of claim 1 wherein the uniquely distinguishing feature is an information pattern.

4. The system of claim 1 wherein the information pattern is emitted at a periodicity that is genlocked with the raster scan of the video display and the raster scan of the sensor.

5. The system of claim 2 wherein the processor contains instructions that when executed perform the steps of:
    identifying the marker detected by the sensor;
    calculating a sensor display offset between an actual position of the identified marker and a predicted position derived from the user motion data;
    converting the sensor display offset to a pixel address offset within the video display; and
    determining a pixel address within the video display from which to continue rendering the virtual object image.

6. The system of claim 1 wherein the sensor comprises a dual linear array.

7. The system of claim 1 wherein the sensor is a complementary metal-oxide semiconductor (CMOS) array.

8. A method for registering a image to a defined external area as perceived through a near-to-eye (NTE) video display worn by a user, comprising:
    affixing a first marker to a known location, wherein the marker exhibits a uniquely distinguishing feature;
    aligning and calibrating a marker sensor operable to detect the uniquely distinguishing feature of the marker to a motion tracker that is operable to discern movements of the NTE video display, each of the sensor and the tracker being rigidly connected together;
    electronically synchronizing a raster scan periodicity of the of the marker sensor and a separate raster scan periodicity of the NTE video display, wherein the periodicity of the marker sensor raster scan is equal to or faster than the periodicity of the NTE video display raster scan; and
    executing commands by a computing device that is in operable communication with the marker sensor, the motion tracker and the NTE video display, whereby the commands cause the computing device to:
        identify the first marker detected by the sensor;
        determine the known location of the first marker;
        calculate a sensor display offset between the known location of the first marker based on the user motion data;
        convert the sensor display offset to a pixel address offset within the NTE video display; and
        determine a pixel address within the NTE video display from which to continue to render the virtual object image.

9. The method of claim 8 further comprising affixing at least a second information marker.

10. The method of claim 8 wherein the first and second information markers are passive information markers.

11. The method of claim 8 wherein the first and the at least second information markers are active information markers.

12. The method of claim 11 wherein the first information marker emits light information at a different frequency than the at least second information marker.

13. The method of claim 11 wherein the first information marker emits light information at the same frequency but in a different timing sequence than the at least second information marker.

14. The method of claim of claim 11 wherein the first and the at least second information markers emit at least one of visible light, infrared light and ultraviolet light.

15. The method of claim 13 wherein the periodicity of the timing sequences of the first information marker and the at last second information marker are genlocked with the raster scan of the NTE video display and the raster scan of the sensor.

16. The method of claim 13 wherein the periodicity of the timing sequences of the first information marker and the at last second information marker are genlocked with the periodicity of at least some of the pixels of the sensor.

17. The method of claim 8, wherein the raster scan of the NTE video display is genlocked with the raster scan of the marker sensor.

18. An apparatus for registering an image to a defined external area as perceived through a near-to-eye (NTE) raster scan video display worn by a user, comprising:
    a marker sensor configured to detect at least one active marker configured to emit an information pattern with a periodicity and to supply marker identification data based on the information pattern;
    a motion tracker rigidly affixed to the marker sensor and configured to sense motion and supply motion data representative thereof;
    a video display configured to render an image, the video display being genlocked with the marker sensor and the information pattern of the marker; and
    a processor in operable communication with the marker sensor, the motion tracker and the video display, the processor operable upon receipt of the motion data and the marker identification data, to cause the virtual object image to appear in the defined external area.

19. The apparatus of claim 18 wherein the marker sensor, the motion tracker, the video display and the processor are rigidly mounted on a headset of the user.

20. The apparatus of claim 18, wherein the marker sensor is rigidly attached to the front of the motion tracker.

* * * * *

UNITED STATES PATENT AND TRADEMARK OFFICE
CERTIFICATE OF CORRECTION

PATENT NO. : 8,362,973 B2
APPLICATION NO. : 12/468601
DATED : January 29, 2013
INVENTOR(S) : Cernasov et al.

Page 1 of 1

It is certified that error appears in the above-identified patent and that said Letters Patent is hereby corrected as shown below:

In the Claims:
Column 12, line 4, in claim 8, "of the" should be deleted;
Column 12, line 37, in claim 14, one of two occurrences of "of claim" should be deleted;

Signed and Sealed this
Seventh Day of May, 2013

Teresa Stanek Rea
*Acting Director of the United States Patent and Trademark Office*